United States Patent
Tsai et al.

(12) 
(10) Patent No.: US 6,479,160 B1
(45) Date of Patent: Nov. 12, 2002

(54) ULTRA HIGH OXYGEN BARRIER FILMS AND ARTICLES MADE THEREFROM

(75) Inventors: Mingliang L. Tsai, Holmdel, NJ (US); Murali K. Akkapeddi, Morristown, NJ (US)

(73) Assignee: Honeywell International Inc., Morris Township, NJ (US)

( * ) Notice: Subject to any disclaimer, the term of this patent is extended or adjusted under 35 U.S.C. 154(b) by 0 days.

(21) Appl. No.: 09/803,703

(22) Filed: Mar. 9, 2001

(51) Int. Cl.$^7$ .......................... B32B 24/00; B29C 47/00
(52) U.S. Cl. .................. 428/474.4; 428/34.6; 428/34.7; 428/35.4; 428/35.7; 428/35.9; 428/411.1; 264/176.1; 264/219; 264/239; 264/241; 264/299
(58) Field of Search ................ 428/34.6, 34.7, 428/35.4, 35.7, 35.9, 474.4, 411.1; 264/176.1, 219, 239, 241, 299

(56) References Cited

U.S. PATENT DOCUMENTS

| | | | |
|---|---|---|---|
| 4,536,409 A | 8/1985 | Farrell et al. | 426/398 |
| 4,702,966 A | 10/1987 | Farrell et al. | 428/500 |
| 4,826,955 A | 5/1989 | Akkapeddi et al. | 528/324 |
| 5,021,515 A | 6/1991 | Cochran et al. | 525/371 |
| 5,055,355 A | 10/1991 | Deantonis et al. | 428/476.3 |
| 5,075,362 A | 12/1991 | Hofeldt et al. | 524/72 |
| 5,202,052 A | 4/1993 | Zenner et al. | 252/188.28 |
| 5,211,875 A | 5/1993 | Speer et al. | 252/188.28 |
| 5,310,497 A | 5/1994 | Speer et al. | 252/188.28 |
| 5,350,622 A | 9/1994 | Speer et al. | 428/215 |
| 5,364,555 A | 11/1994 | Zenner et al. | 252/188.28 |
| 5,529,833 A | 6/1996 | Speer et al. | 428/215 |
| 5,541,267 A | 7/1996 | Akkapeddi et al. | 525/432 |
| 5,547,765 A | 8/1996 | Degrassi et al. | 428/474.7 |
| 5,639,815 A | 6/1997 | Cochran et al. | 524/413 |
| 5,747,560 A | 5/1998 | Christiani et al. | 523/209 |
| 5,981,676 A | 11/1999 | Gauthier et al. | 526/308 |

FOREIGN PATENT DOCUMENTS

JP 51-109998 9/1976

OTHER PUBLICATIONS

Borggreve, R.J.M., et al "Impact Modification of poly(caprolactam) by copolymerization with a low molecular weight polybutadiene" Polymer, vol. 29, Aug. 1988, pp. 1441–1446.

U.S. patent application Ser. No. 09/562,249 filed May 2, 2000. Akkapeddi, et al Title: Oxygen Scavenging High Barrier Polyamide Compositions for Packaging Applications (copy not provided).

*Primary Examiner*—P. Hampton-Hightower
(74) *Attorney, Agent, or Firm*—Roger H. Criss

(57) ABSTRACT

Oxygen barrier films exhibiting high oxygen scavenging capability suitable for extended shelf-life, packaging applications. These films comprise a polyamide homopolymer, copolymer, or blends thereof; an ethylene vinyl alcohol copolymer; an oxidizable polydiene; and at least one metal salt catalyst. These films are particularly suited to making high barrier, retortable packaging structures such as pouches, containers etc. Such articles are useful for packaging a variety of oxygen-sensitive foods, beverage, medical and health care products.

37 Claims, No Drawings

ULTRA HIGH OXYGEN BARRIER FILMS AND ARTICLES MADE THEREFROM

BACKGROUND OF THE INVENTION

1. Field of the Invention

The present invention relates to oxygen barrier films. More particularly, it relates to oxygen scavenging barrier films having extremely low oxygen transmission rates (OTR) at varying relative humidity (RH) levels. Such films are particularly useful for the production of bags, pouches and liners for containers providing long shelf-life packaging of oxygen-sensitive food and beverage products, condiments, as well as certain pharmaceutical and health care products.

2. Description of the Related Art

It is well known in the art to provide polymer based packaging articles such as films, bottles, containers, and the like, which are useful for food packaging. Many such articles are made of plastics including ethylene vinyl alcohol copolymers and the like in order to achieve the desired barrier properties. For example, U.S. Pat. Nos. 5,055,355 and 5,547,765 teach laminates of polyamides and ethylene vinyl alcohol copolymers which have good oxygen barrier properties.

In order to enhance freshness preservation, it is a standard practice to package food and beverage products within a packaging structure composed of laminated sheets of two or more plastics. Such packaging structures generally include a barrier plastic layer which has a low permeability to oxygen. The packaging structure can be thin, in which case it is wrapped around the item being packaged, or it can be thick enough to form a shaped container.

It is known in the art to include an oxygen scavenger in the packaging structure. An oxygen scavenger reacts with oxygen that is trapped in the package or that permeates into the package. This is described, for example, in U.S. Pat. Nos. 4,536,409 and 4,702,966. U.S. Pat. No. 4,536,409 describes cylindrical containers formed from such packaging plastics.

Various types of oxygen scavengers have been proposed for this purpose. U.S. Pat. No. 4,536,409 recommends potassium sulfite as an oxygen scavenger. U.S. Pat. No. 5,211,875 discloses the use of unsaturated hydrocarbons as oxygen scavengers in packaging films. It is known in the art that ascorbic acid derivatives as well as sulfites, bisulfites, phenolics, and the like can be oxidized by molecular oxygen, and can thus serve as an oxygen scavenging material. U.S. Pat. No. 5,075,362 discloses the use of ascorbate compounds in containers as oxygen scavengers. U.S. Pat. Nos. 5,202,052 and 5,364,555 describe polymeric material carriers containing oxygen scavenging material. These polymeric carriers for the oxygen scavenging material include polyolefin, polyvinylchloride (PVC), polyurethanes, ethylene vinyl acetate (EVA) and polyethylene terephthalate (PET).

U.S. Pat. No. 5,021,515, 5,049,624 and 5,639,815 disclose packaging materials and processes therefor which utilize a polymer composition which is capable of scavenging oxygen. Such compositions include an oxidizable organic polymer component, preferably a polyamide, such as nylon MXD6, and a metal oxidation promoter, such as a cobalt compound. These compositions can be used with PET, for example.

U.S. Pat. No. 5,529,833 describes the use of a composition comprising an ethylenically unsaturated hydrocarbon oxygen scavenger which is incorporated into a film layer, and used for making packaging for oxygen sensitive products. The oxygen scavenger is catalyzed by a transition metal catalyst and a chloride, acetate, stearate, palmitate, 2-ethylhexanoate, neodecanoate or naphthenate counterion. Preferred metal salts are selected from cobalt (II) 2-ethylhexanoate and cobalt (II) neodecanoate.

Despite these advances in the art, many known oxygen barrier materials, particularly those containing nylon or EVOH, are extremely moisture sensitive and lose their oxygen barrier at high relative humidity (RH) levels. Furthermore, it is known that some oxygen scavenging materials can readily scavenge oxygen at high RH levels, but not at low RH levels. Thus, there remains a need for an oxygen barrier polymer material which can provide high oxygen scavenging capability while maintaining extremely low oxygen transmission rates at varying relative humidity levels.

Another use of oxygen barrier materials is in the retortable packages such as pouches and containers used for sterilization and storage of various food, medical and health care products. Retort is a process where the package is conditioned with steam at 121° C. for 30 minutes in order to sterilize the contents of the package. Most oxygen barrier polymers including standard EVOH cannot survive such retort conditions. The layers either become hazy, distorted or delaminated due to the severe heat history and moisture absorption. In addition, they lose their oxygen barrier property after retort due to the absorbed moisture. U.S. Pat. Nos. 5,716,715, 5,547,765 and Japan Patent No. 2000108256, 11199741, 9234833 disclose some methods to make EVOH retortable. However, the only property improved even in these retortable EVOH examples is the retention of clarity after retort. The retortable EVOH materials in these references still exhibit moisture sensitivity and a 'retort shock', in which the moisture trapped in EVOH layer causes a severe loss in the oxygen barrier properties. Hence the barrier retention in the film after retort is still a problem.

It would be desirable to provide films which overcome these problems.

SUMMARY OF THE INVENTION

The invention provides an oxygen barrier film which comprises:
 a) a polyamide layer comprising a polyamide homopolymer, copolymer, or blends thereof;
 b) an ethylene vinyl alcohol copolymer layer attached to the polyamide layer; and
 c) an oxidizable polydiene and a metal salt catalyst present together in at least one of the polyamide layer and the ethylene vinyl alcohol copolymer layer.

The invention further provides a multilayer article which comprises an oxygen barrier film comprising:
 A) a multilayer film comprising:
  a) a polyamide layer comprising a polyamide homopolymer, copolymer, or blends thereof;
  b) an ethylene vinyl alcohol copolymer layer attached to the polyamide layer;
  c) an oxidizable polydiene and a metal salt catalyst present together in at least one of the polyamide layer and the ethylene vinyl alcohol copolymer layer; and
 B) a thermoplastic polymer layer on one or both sides of the film.

The invention still further provides a shaped article which comprises an oxygen barrier film comprising:

a) a polyamide layer comprising a polyamide homopolymer, copolymer, or blends thereof;

b) an ethylene vinyl alcohol copolymer layer attached to the polyamide layer;

c) an oxidizable polydiene and a metal salt catalyst present together in at least one of the in at least one of the polyamide layer and the ethylene vinyl alcohol copolymer layer.

The invention also provides a process for producing an oxygen barrier film which comprises:

a) separately melting a polyamide homopolymer, copolymer, or blends thereof; and an ethylene vinyl alcohol copolymer;

b) blending an oxidizable polydiene, and a metal salt catalyst with either or both of the molten polyamide homopolymer, copolymer, or blend thereof; and the molten ethylene vinyl alcohol copolymer to thereby form an individual polyamide composition and an individual ethylene vinyl alcohol composition;

c) extruding, casting or blowing the individual compositions into an individual polyamide film layer and an individual ethylene vinyl alcohol copolymer layer;

d) cooling the polyamide layer and the ethylene vinyl alcohol copolymer layer; and e) attaching the polyamide layer and ethylene vinyl alcohol copolymer layer to each other.

The invention yet further provides a process for producing an oxygen barrier film which comprises:

a) melting a polyamide homopolymer, copolymer, or blends thereof; and blending with an oxidizable polydiene and a metal salt catalyst therewith to form a polyamide composition and forming a polyamide film layer from the polyamide composition;

b) melting an ethylene vinyl alcohol copolymer; and blending the copolymer with an oxidizable polydiene and a metal salt catalyst to form an ethylene vinyl alcohol composition, and forming an ethylene vinyl alcohol film layer from the an ethylene vinyl alcohol composition; and c) conducting step (i) or (ii) or (iii):
   (i) attaching the polyamide film layer to a neat ethylene vinyl alcohol copolymer film layer which is substantially free of oxidizable polydiene and metal salt catalyst;
   (ii) attaching the ethylene vinyl alcohol copolymer film layer to a neat polyamide film layer which is substantially free of oxidizable polydiene and metal salt catalyst; or
   (iii) attaching the polyamide film layer to the ethylene vinyl alcohol copolymer film layer.

The invention also provides a process for producing an oxygen barrier article which comprises:

a) separately melting a polyamide homopolymer, copolymer, or blends thereof; and an ethylene vinyl alcohol copolymer;

b) blending an oxidizable polydiene, and a metal salt catalyst with either or both of the molten polyamide homopolymer, copolymer, or blend thereof; and the molten ethylene vinyl alcohol copolymer to thereby form an individual polyamide composition and an individual ethylene vinyl alcohol composition; and c) conducting either step (i) or (ii) or (iii):
   (i) coextruding, casting, blowing, thermoforming, blow molding or coinjecting the polyamide composition with the ethylene vinyl alcohol copolymer composition to thereby form an oxygen barrier article;
   (ii) melting a neat polyamide homopolymer, copolymer, or blend thereof which is substantially free of oxidizable polydiene and metal salt catalyst to form a neat polyamide composition; and then coextruding, casting, blowing, thermoforming, blow molding or coinjecting the neat polyamide composition with the ethylene vinyl alcohol copolymer composition to thereby form an oxygen barrier article;
   (iii) melting a neat ethylene vinyl alcohol copolymer which is substantially free of oxidizable polydiene and metal salt catalyst to form a neat ethylene vinyl alcohol composition; and then coextruding, casting, blowing, thermoforming, blow molding or coinjecting the neat ethylene vinyl alcohol composition with the polyamide composition to thereby form an oxygen barrier article.

It has been unexpectedly found that the films of the present invention maintain excellent oxygen scavenging and barrier properties across all RH ranges. As mentioned above, this invention provides an oxygen scavenging barrier film which comprises (a) a polyamide layer comprising a polyamide homopolymer, copolymer, or blends thereof and (b) an ethylene vinyl alcohol copolymer layer attached to the polyamide layer and (c) an oxidizable polydiene and a metal salt catalyst present together in at least one of the above two layers.

The films of this invention are particularly suited to making high barrier, retortable packaging structures such as pouches, containers etc. Such articles are useful for packaging a variety of oxygen-sensitive foods, beverage, medical and health care products.

DETAILED DESCRIPTION OF THE PREFERRED EMBODIMENT

According to the present invention, an improved oxygen barrier film and article is prepared which includes a polyamide layer comprising a polyamide homopolymer, copolymer, or blends thereof; an ethylene vinyl alcohol copolymer layer attached to the polyamide layer; and an oxidizable polydiene and a metal salt catalyst present together in at least one of the two layers.

The preferred polyamide homopolymer or copolymer is selected from aliphatic polyamides and aliphatic/aromatic polyamides having a molecular weight of from about 10,000 to about 100,000. General procedures useful for the preparation of polyamides are well known to the art. Useful diacids for making polyamides include dicarboxylic acids which are represented by the general formula:

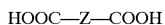

HOOC—Z—COOH wherein Z is representative of a divalent aliphatic radical containing at least 2 carbon atoms, such as adipic acid, sebacic acid, octadecanedioic acid, pimelic acid, suberic acid, azelaic acid, dodecanedioic acid, and glutaric acid. The dicarboxylic acids may be aliphatic acids, or aromatic acids such as isophthalic acid and terephthalic acid. Suitable diamines for making polyamides include those having the formula:

$H_2N(CH_2)_nNH_2$ wherein n has an integer value of 1–16, and includes such compounds as trimethylenediamine, tetramethylenediamine, pentamethylenediamine, hexamethylenediamine, octamethylenediamine, decamethylenediamine, dodecamethylenediamine, hexadecamethylenediamine, aromatic diamines such as p-phenylenediamine, 4,4'-diaminodiphenyl ether, 4,4'-diaminodiphenyl sulphone, 4,4'-diaminodiphenylmethane, alkylated diamines such as 2,2-dimethylpentamethylenediamine, 2,2,4-trimethylhexamethylenediamine, and 2,4,4 trimethylpentamethylenediamine, as well as cycloaliphatic diamines, such as diaminodicyclohexyhnethane, and other compounds. Other useful diamines include heptamethylenediamine, nonamethylenediamine, and the like.

Useful aliphatic polyamide homopolymers include poly (4-aminobutyric acid) (nylon 4), poly(6-aminohexanoic acid) (nylon 6, also known as poly(caprolactam)), poly(7-aminoheptanoic acid) (nylon 7), poly(8-aminooctanoic acid) (nylon 8), poly(9-aminononanoic acid) (nylon 9), poly(10-aminodecanoic acid) (nylon 10), poly(11-aminoundecanoic acid) (nylon 11), poly(12-aminododecanoic acid) (nylon 12), poly(hexamethylene adipamide) (nylon 6,6), poly (hexamethylene sebacamide) (nylon 6,10), poly (heptamethylene pimelamide) (nylon 7,7), poly (octamethylene suberamide) (nylon 8,8), poly(hex amethylene azelamide) (nylon 6,9), poly(nonamethylene azelamide) (nylon 9,9), poly(decamethylene azelamide) (nylon 10,9), poly(tetramethylene adipamide (nylon 4,6), caprolactam/hexamethylene adipamide copolymer (nylon 6,6/6), hexamethylene adipamide/caprolactam copolymer (nylon 6/6,6), trimethylene adipamide/hexamethylene azelaiamide copolymer (nylon trimethyl 6,2/6,2), hexamethylene adipamide-hexamethylene-azelaiamide caprolactam copolymer (nylon 6,6/6,9/6), poly(tetramethylenediamine-co-oxalic acid) (nylon 4,2), the polyamide of n-dodecanedioic acid and hexamethylenediamine (nylon 6,12), the polyamide of dodecamethylenediamine and n-dodecanedioic acid (nylon 12,12), as well as blends and copolymers thereof and other polyamides which are not particularly delineated here. Of these, preferred polyamides include polycaprolactam, known in the art as nylon 6,and polyhexamethylene adipamide, known in the art as nylon 6,6, and mixtures and blends thereof. A most preferred polyamide comprises polycaprolactam.

Polyamides used in the practice of this invention may be obtained from commercial sources or prepared in accordance with known preparatory techniques. For example, poly(caprolactam) can be obtained from Honeywell International Inc., Morristown, New Jersey under the trademark CAPRON®. Suitable variants of CAPRON® for use as a first polyamide in the present invention include CAPRON® 8200 nylon, a balanced nylon 6 having a formic acid viscosity (FAV) of 75, CAPRON® 1767 nylon, a balanced nylon 6 having an FAV of 35, and CAPRON® 8224HSL nylon, a heat stabilized, lubricated nylon 6 having an FAV of 60. A suitable variant of CAPRON® nylon for use as a second polyamide includes CAPRON® 1250 nylon, an amine-terminated nylon 6 with a FAV of 60 and having terminal amino groups of 70 to 78 milliequivalents per gram.

Examples of aliphatic/aromatic polyamides include poly (2,2,2-trimethyl hexamethylene terephthalamide), poly(p-xylylene adipamide), poly(hexamethylene terephthalamide) (nylon 6,T), poly(hexamethylene isophthalamide) (nylon 6, I), poly(dodecamethylene terephthalamide), polyamide 6T/6I, poly(tetramethylenediamine-co-isophthalic acid) (nylon 4,I), polyamide 6/MXDT/I, polyamide MXDI, hexamethylene adipamide/hexamethylene-isophthalamide (nylon 6,6/6I), hexamethylene adipamide/hexamethyleneterephthalamide (nylon 6,6/6T) and as well as others which are not particularly delineated here. Blends of two or more aliphatic/aromatic polyamides and/or aliphatic polyamides can also be used. Aliphatic/aromatic polyamides can be prepared by known preparative techniques or can be obtained from commercial sources. Other suitable polyamides are described in U.S. Pat. Nos. 4,826,955 and 5,541,267, which are incorporated herein by reference.

The polyamide component is preferably present in the overall polyamide layer in an amount of from about 80% to about 100% by weight, preferably from about 90% to about 100% and more preferably from about 95% to about 100%.

The ethylene vinyl alcohol copolymer layer of the invention is attached to the polyamide layer. Copolymers of ethylene and vinyl alcohol suitable for use in the present invention can be prepared by the methods disclosed in U.S. Pat. Nos. 3,510,464; 3,560,461; 3,847,845; and 3,585,177.

The ethylene vinyl alcohol copolymer can be hydrolyzed ethylene vinyl acetate copolymer. The degree of hydrolysis can range from 85 to 99.5%. The ethylene vinyl alcohol copolymer preferably contains from about 15 to about 65 mol percent ethylene, and more preferably from about 25 to about 50 mol percent ethylene. Copolymers of lower than about 15 mol percent ethylene tend to be difficult to extrude while those above 65 mol percent ethylene have reduced oxygen barrier performance, as described in U.S. Pat. No. 3,595,740. The ethylene vinyl alcohol copolymers of the invention preferably exhibit good oxygen barrier property such as an oxygen permeability of <1 cc.mil/100 in$^2$/day in air.

Useful ethylene vinyl alcohol copolymers suitable for the present invention are commercially available from Kuraray, Nippon Gohsei, both of Japan, and EVAL Company of America, Noltex, both of US. Kuraray of Japan produces an ethylene vinyl alcohol copolymer under the designation "EP-E" which has 44% ethylene, a number average molecular weight of about 29,500 and melting point of 164° C. Other manufacturers produce suitable ethylene vinyl alcohol copolymers. One suitable grade has about 32% ethylene with a melting point of 183° C. Another suitable copolymer has about 29% ethylene, a number average molecular weight of about number average 22,000 and a melting point of 188° C. Another described in U.S. Pat. No. 4,252,169 has 40% ethylene, a number average molecular weight of about 26,000 and a melting point of 164° C. The number average molecular weight can be measured by osmometry.

The ethylene vinyl alcohol composition of the invention may be comprised of an ethylene vinyl alcohol copolymer grade which is "retortable". Retort is a process where a package is conditioned in steam at 121° C. for 30 minutes. "Retortable" grade of ethylene-vinyl alcohol is defined as a material which remains clear without haze or microcracking after conditioning at 121° C. in steam for 30 minutes. Such copolymers suitable for use in the present invention can be prepared by the methods disclosed in Japan Patent Application No. 2000108256, 11199741, 9234833, 6345919, 5271498. Standard EVOH, without modification, cannot survive the retort conditions. There are methods that can make EVOH retortable. One is by blending EVOH with aliphatic or aromatic polyamides as described by U.S. Pat. Nos. 5,716,715, or 5,547,76. Different materials can be also added to EVOH to make it retortable, which are disclosed in above mentioned Japan Patents. For example, there are commercially available retortable grades of EVOH, i.e., SG372 from Nippon Gohsei and XEP 335 from Kuraray and EVAL Company of America.

The polyamide layer and the EVOH layer of the invention contain either individually or simultaneously at least one functional, oxidizable polydiene as an oxygen scavenger.

Such polydienes preferably comprise low molecular weight, small particles which are compatible and uniformly dispersible in either the polyamide or the EVOH layer. Preferably the polydiene comprises an epoxy or anhydride functionality such that it reacts with the carboxyl or amino end groups of the polyamide or the hydroxyl group of the EVOH copolymer. The functionality in the polydiene may also react with amide group in the polyamide backbone. The functionality can be pendant to the backbone or at the chain ends of the polydiene or polyether. The preferred functional polydienes are functional polyalkadiene oligomers which can have the following general backbone structure:

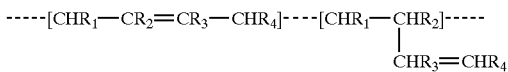

where $R_1$, $R_2$, $R_3$ and $R_4$ can be the same or different and can be selected from hydrogen (—H) or any of the lower alkyl groups (methyl, ethyl, propyl, butyl etc.). $R_2$ & $R_3$ may also be a chloro (—Cl) group. Illustrative of the backbone structure are polybutadiene (1,4 or 1,2 or mixtures of both), polyisoprene (1,4 or 3,4), poly 2,3-dimethyl butadiene, polychloroprene, poly 2,3-dichlorobutadiene, polyallene, polyl,6-hexatriene, etc.

Specific non-limiting examples of functional, oxidizable polydienes as suitable oxygen scavengers include epoxy functionalized polybutadiene (1,4 and/or 1,2), maleic anhydride grafted or copolymerized polybutadiene (1,4 and/or 1,2), epoxy functionalized polyisoprene, and maleic anhydride grafted or copolymerized polyisoprene. The preferred oxygen scavenger is a maleic anhydride functional polybutadiene oligomer. The oxygen scavenger is preferably present in the polyamide layer as a large number of small particles.

The molecular weight of the polydiene component preferably ranges from about 500 about to 5,000, more preferably from about 750 to about 3000 and most preferably from about 1000 to about 2000. It is preferably present in the polyamide layer or the ethylene vinyl alcohol layer in an amount of from about 0.1% to about 10% by weight, more preferably from about 1% to about 10% and most preferably from about 2% to about 5%. The polydiene preferably comprises particles whose average size is in the range of from about 10 nm to about 1000 nm, and wherein the particles are substantially uniformly distributed in the polyamide layer or the ethylene vinyl alcohol layer. The polyamide layer may comprise either a blend comprising the polyamide or the ethylene vinyl alcohol layer with the polydiene, or a reaction product of the polyamide or the ethylene vinyl alcohol layer with the polydiene.

The polyamide or the EVOH layer further comprises a metal salt catalyst such as a metal fatty acid salt catalyst, for example a low molecular weight metal carboxylate salt catalyst. Suitable metal fatty acid salt catalysts have a counterion which is an acetate, stearate, propionate, hexanoate, octanoate, benzoate, salicylate, and cinnamate or combination thereof. Preferably the metal fatty acid salt catalyst comprises a cobalt, copper or ruthenium, acetate, stearate, propionate, hexanoate, octanoate, benzoate, salicylate or cinnamate, or combinations thereof The preferred metal carboxylate comprises cobalt, ruthenium or copper carboxylate. Of these the more preferred comprises cobalt or copper carboxylate and the most preferred comprises cobalt carboxylate. It is preferably present in the polyamide layer in an amount of from about 0% to about 1% by weight of the layer, preferably from about 0.001% to about 0.5% by weight of the layer and more preferably from about 0.005% to about 0.1% by weight of the layer. The most preferred range is from about 0.01% to about 0.05% by weight of the layer.

Optionally but preferably, the polyamide or the EVOH layer further comprises a nanometer scale dispersed clay, known in the art as a nanoclay. Suitable clays are described in U.S. Pat. No. 5,747,560, which is incorporated herein by reference. Preferred clays non-exclusively include a natural or synthetic phyllosilicate such as montmorillonite, hectorite, vermiculite, beidilite, saponite, nontronite or synthetic flouromica, which has been cation exchanged with a suitable organoammonium salt. The preferred clay is montmorillonite, hectorite or synthetic flouromica. The more preferred clay is the montmorillonite or hectorite. The most preferred clay is montmorillonite. The preferred organoammonium cation for treating the clay is N,N',N'',N''' Bis(hydroxyethyl), methyl, octadecyl ammonium cation or ω-carboxy alkylammonium cation, i.e., the ammonium cation derived such ω-aminoalkanoic acids as 6-aminocaproic acid, 1 1-aminoundecanoic acid, 12-aminododecanoic acid. The preferred fine dispersions of nanometer scale silicate platelets are obtained either via an in-situ polymerization of polyamide forming monomer(s) or via melt compounding of polyamide or ethylene vinyl alcohol copolymer in the presence of the organoammonium salt treated clay. The clay preferably has an average platelet thickness in the range of from about 1 nm to about 100 nm and an average length and average width each in the range of from about 50 nm to about 500 nm. It is optionally but preferably present in at least one of the polyamide layer and ethylene vinyl alcohol layer in an amount of from about 0% to about 10% by weight of the layer, more preferably from about 2% to about 8% by weight of the later, and most preferably from about 3% to about 6% by weight of the layer.

The ethylene vinyl alcohol copolymer layer and the polyamide layer of the invention may each independently optionally include one or more conventional additives whose uses are well known to those skilled in the art. The use of such additives may be desirable in enhancing the processing of the layers as well as improving the products or articles formed therefrom. Examples of such include: oxidative and thermal stabilizers, lubricants, mold release agents, heat stabilizers, ultraviolet light stabilizers, nucleators, plasticizers, as well as other conventional additives known to the art. Such may be used in amounts of up to about 10% by weight of each independent layer.

Suitable ultraviolet light stabilizers include various substituted resorcinols, salicylates, benzotriazole, benzophenones, and the like. Suitable lubricants and mold release agents include stearic acid, stearyl alcohol, and stearamides. Representative heat stabilizers include the Period Table of Element's Group I metal halides, such as sodium halides, potassium halides, lithium halides; as well as cuprous halides; and further, chlorides, bromides, iodides. Also, hindered phenols, hydroquinones, aromatic amines as well as substituted members of those above mentioned groups and combinations thereof. Suitable plasticizers include lactams such as caprolactam and lauryl lactam, sulfonamides such as o,p-toluenesulfonamide and N-ethyl, N-butyl benzenesulfonamide, and combinations of any of the above, as well as other plasticizers known to the art.

Preferably the oxygen barrier film of the invention is produced via a melt extrusion compounding of the components of each layer. Each layer may be formed by dry blending solid particles or pellets of each of the components of that layer to form a mixture, and then melt blending the mixture in a suitable mixing means such as an extruder, a roll mixer or the like. Typical melting temperatures range from about 230° C. to about 300° C., preferably from about 235° C. to about 280° C. and more preferably from about 240° C. to about 260° C. for nylon 6 and its copolymers, and about 210–250° C. for EVOH. Blending is conducted for a period of time required to attain a substantially uniform blend. Such may easily be determined by those skilled in the art. If desired, the blend may be cooled and cut into pellets for further processing, it may be extruded into a fiber, a filament, or a shaped element or it may be formed into films and optionally uniaxially or biaxially stretched by means well known in the art.

The oxygen barrier films and articles of this invention may be produced by any of the conventional methods of producing films and articles, including extrusion and blown film techniques, bottles via extrusion or injection stretch blow molding and containers via thermoforming techniques. Processing techniques for making films, sheets, containers and bottles are well known in the art. For example, the components of each layer may be preblended and then the blend fed into an infeed hopper of an extruder, or each layer's components may be fed into infeed hoppers of an extruder and then blended in the extruder. The melted and plasticated streams from the extruder may be fed into a single manifold die and extruded into a layer. It then emerges from the die as a single layer of material. After exiting the die, the layers are cast onto a first controlled temperature casting roll, they pass around the first roll, and then onto a second controlled temperature roll, which is normally cooler than the first roll. The controlled temperature rolls largely control the rate of cooling of the layers after they exit the die. Once cooled and hardened, the resulting film is preferably substantially transparent.

Alternatively the layers may be formed into a film using a conventional blown film apparatus. The film forming apparatus may be one which is referred to in the art as a "blown film" apparatus and includes a circular die head for bubble blown film through which the plasticized film composition is forced and formed into a film "bubble". The "bubble" is ultimately collapsed and formed into a film.

The films of this invention may be formed as an integral layer in a multilayered film, or container which include one or more layers of another thermoplastic polymer such as polyesters- particularly polyethylene terephthalate (PET) and PET copolymers, polyolefins, acrylonitrilecopolymers, acrylic polymers, vinyl polymers, polycarbonate, polystyrene, etc. as structural layers. These structural layers can be attached to the barrier films of the invention as an integral coextrusion process or lamination process. The films of this invention are particularly suitable as barrier layers in the construction and fabrication of thermoformed containers in which PET or polyolefin function as structural layers.

Useful polyesters for coextrusion or lamination process include polyethylene terephthalate (PET) and its copolymer in the intrinsic viscosity (I.V.) range of 0.5–1.2 dl/g range, more preferably in the I.V. range of 0.6 to 1.0 and most preferably in the I.V. range of 0.7–0.9. The polyolefins useful for the coextrusion or lamination process include polymers of alpha-olefin monomers having from about 2 to about 6 carbon atoms and includes homopolymers, copolymers (including graft copolymers), and terpolymers of alpha-olefins. Illustrative homopolymer examples include ultra low density (ULDPE), low density (LDPE), linear low density (LLDPE), medium density (MDPE), or high density polyethylene (HDPE); polypropylene; polybutylene; polybutene-1; poly-3-methylbutene-1; poly-pentene-1; poly-4-methylpentene-1; polyisobutylene; and polyhexene. The polyolefm may have a weight average molecular weight of about 1,000 to about 1,000,000, and preferably about 10,000 to about 500,000. Preferred polyolefins are polyethylene, polypropylene, polybutylene and copolymers, and blends thereof. The most preferred polyolefins are polyethylene and polypropylene.

The multilayered oxygen barrier articles of this invention can be formed by any conventional technique for forming films, including lamination, extrusion lamination, and coextrusion film blowing. The preferred method for making such multilayer films is by coextrusion. For example, the materials for the individual layers, as well as any optional layers, are fed into infeed hoppers of the extruders of like number, with each extruder handling the material for one or more of the layers. The melted and plasticated streams from the individual extruders are fed into a single manifold co-extrusion die. While in the die, the layers are juxtaposed and combined, then emerge from the die as a single multiple layer film of polymeric material. After exiting the die, the film is cast onto a first controlled temperature casting roll, passes around the first roll, and then onto a second controlled temperature roll, which is normally cooler than the first roll. The controlled temperature rolls largely control the rate of cooling of the film after it exits the die. In another method, the film forming apparatus may be one which is known in the art as a blown film apparatus and includes a multi-manifold circular die head for bubble blown film through which the plasticized film composition is forced and formed into a film bubble which may ultimately be collapsed and formed into a film. Processes of coextrusion to form film and sheet laminates are generally known. Alternatively the individual layers may first be formed into sheets and then laminated together under heat and pressure with or without intermediate adhesive layers.

Optionally, an adhesive layer, also known in the art as a "tie" layer, may be placed between each film layer. Non-limiting examples of other optional polymeric layers and adhesive or tie layers which can be used in the film laminate of the present invention are disclosed in U.S. Pat. Nos. 5,055,355; 3,510,464; 3,560,461; 3,847,845; 5,032,656; 3,585,177; 3,595,740; 4,284,674; 4,058,647; and 4,254,169. In accordance with the present invention, suitable adhesive polymers include modified polyolefin compositions having at least one functional moiety selected from the group consisting of unsaturated polycarboxylic acids and anhydrides thereof. Such unsaturated carboxylic acid and anhydrides include maleic acid and anhydride, fumaric acid and anhydride, crotonic acid and anhydride, citraconic acid and anhydride, itaconic acid an anhydride and the like. Of these, the most preferred is maleic anhydride. The modified polyolefins suitable for use in this invention include compositions described in U.S. Pat. Nos. 3,481,910; 3,480,580; 4,612,155 and 4,751,270 which are incorporated herein by reference. Other adhesive layers non-exclusively include alkyl ester copolymers of olefins and alkyl esters of $\alpha,\beta$-ethylenically unsaturated carboxylic acids such as those described in U.S. Pat. No. 5,139,878. The preferred modified polyolefin composition comprises from about 0.001 to about 10 weight percent of the functional moiety, based on the total weight of the modified polyolefin. More preferably the functional moiety comprises from about 0.005 to about 5 weight percent, and most preferably from about 0.01 to about 2 weight percent. The modified polyolefin composition may also contain up to about 40 weight percent of thermoplastic elastomers and alkyl esters as described in U.S. Pat. No. 5,139,878. Alternatively, one or more adhesive polymers may be directly blended or coextruded into other layers of the film, thus providing adhesion while minimizing the number of layers in the film.

Films produced according to the present invention may be oriented by stretching or drawing the films at draw ratios of from about 1.1:1 to about 10:1, and preferably at a draw ratio of from about 2:1 to about 5:1. The term "draw ratio" as used herein indicates the increase of dimension in the direction of the draw. Therefore, a film having a draw ratio of 2:1 has its length doubled during the drawing process. Generally, the film is drawn by passing it over a series of preheating and heating rolls. The heated film moves through a set of nip rolls downstream at a faster rate than the film entering the nip rolls at an upstream location. The change of rate is compensated for by stretching in the film.

Such films may be stretched or oriented in any desired direction using methods well known to those skilled in the art. The films may be stretched uniaxially in either the longitudinal direction coincident with the direction of movement of the film being withdrawn from the film forming apparatus, also referred to in the art as the "machine direction", or in as direction which is perpendicular to the machine direction, and referred to in the art as the "transverse direction", or biaxially in both the longitudinal direction and the transverse direction.

The thicknesses of such films preferably range from about 0.05 mils (1.3 $\mu$m) to about 100 mils (2540 $\mu$m), and more preferably from about 0.05 mils (1.3 $\mu$m) to about 50 mils (1270 $\mu$m). While such thicknesses are preferred as providing a readily flexible film, it is to be understood that other film thicknesses may be produced to satisfy a particular need and yet fall within the scope of the present invention; such thicknesses which are contemplated include plates, thick films, and sheets which are not readily flexible at room temperature (approx. 20° C.).

One noteworthy characteristic of the articles formed from the films of this invention is that they exhibit excellent gas barrier properties, particularly oxygen barrier properties, at varying relative humidity (RH) levels. Oxygen permeation resistance or barrier may be measured using the procedure of ASTM D-3985. In general, the films of this invention have an oxygen transmission rate ($O_2$ TR) at 90% relative humidity less than about 1.0 $cm^3$/100 $in^2$ (645 $cm^2$)/24 hrs/Atm at 23° C. and usually less than about 0.5 $cm^3$/100 $in^2$ (645 $cm^2$)/24 hrs/Atm at 23 ° C.

The following non-limiting examples serve to illustrate the invention. It will be appreciated that variations in proportions and alternatives in elements of the components of the invention will be apparent to those skilled in the art and are within the scope of the present invention.

PROCESSING DETAILS

Reactive Extrusion

Process 1: A Leistritz 18-mm co-rotating twin screw extruder equipped with a K-Tron volumetric feeder was employed. The modified polybutadiene (either maleic anhydride functionalized polybutadiene—Ricon 131MA, or epoxy functionalized polybutadiene—Elf-Atochem Poly BD 600/Poly BD605E) was stored in a sealed drum and metered with a Nichols-Zenith pump directly into a sealed extruder barrel directly following the feed barrel. The polybutadiene was injected prior to the first (of two) mixing zones via a Leistritz direct liquid injection nozzle. Nylon 6 pellets, EVOH pellets, blends of polyamide or EVOH with other materials, were fed into the nitrogen-blanketed throat of the extruder at a rate of 10 pounds (22 kg) per hour. The polybutadiene was pumped at a rate such that weight percentages of 1% to 5% polybutadiene were added. The extruder was equipped with two mixing zones consisting primarily of kneading elements. The extruder was equipped with a vacuum zone subsequent to the second mixing zone and prior to the die plate. The extrudate was quenched in a water bath and then pelletized.

Process 2: A Leistritz 18-mm co-rotating twin screw extruder equipped with a K-Tron volumetric feeder was employed. A blend of nylon 6 pellets (or EVOH pellets in another formulation) and cobalt stearate pastilles were fed into the nitrogen-blanketed throat of the extruder at a rate of 10 pounds (22 kg) per hour. The extruder was equipped with two mixing zones consisting primarily of kneading elements. The extrudate was quenched in a water bath and then pelletized. The resulting pellets were used as a masterbatch additive in some of the processes listed below.

Process 3: A Leistritz 18-mm co-rotating twin screw extruder equipped with a K-Tron volumetric feeder was employed. The polybutadiene (either maleic anhydride functionalized polybutadiene—Ricon 131MA5, or epoxy functionalized polybutadiene—Elf-Atochem Poly BD 600/Poly BD 605E) was stored in a sealed drum vessel and metered with a Nichols-Zenith pump directly in the extruder barrel following the feed throat. The polybutadiene was injected directly into the extruder prior to the first (of two) mixing zones via a Leistritz direct liquid injection nozzle. A blend of nylon 6 (or EVOH in another formulation) and cobalt stearate masterbatch was fed into the nitrogen-blanketed throat of the extruder at a rate of 10 pounds per hour. The blend consisted of approximately 98 weight percent nylon 6 and 2 weight percent cobalt masterbatch. In another formulation, the blend consisted of approximately 98 weight percent EVOH and 2 weight percent cobalt masterbatch. The polybutadiene was pumped at a rate such that weight percentages of 1% to 5% polybutadiene were added. The extruder was equipped with two mixing zones consisting primarily of kneading elements. The extruder was equipped with a vacuum zone subsequent to the second mixing zone and prior to the die plate. The extrudate was quenched in a water bath and then pelletized.

Pellet Blending

Process 4: Blending of 98 weight percent material prepared in process 1 (or other material) and 2 weight percent material prepared in process 2. Blending was accomplished by weighing out required amount of each material into a large container. The container was tumbled for approximately 5 minutes to ensure thorough mixing of the two components. These blends were used subsequently as feedstock for cast film processing.

Monolayer Film

Process 5: A 19 mm Haake single screw extruder equipped with a six-inch (152.4 mm) wide film die was flood fed with pellets from process 1, 2, 3 or 4. Extruder temperature was set at approximately 250° C. The extrudate passed through the slit die onto a heated Killion cast roll. Film thickness was adjusted via cast roll speed and/or screw RPM to prepare a film with typical thickness of 0.001 inch to 0.004 inch (0.0254 to 0.1016 mm).

Multilayer Film

Process 6: Three Killion single screw extruders equipped with a twelve-inch (304.8 mm) wide film coextrusion die were utilized to prepare a multilayer film (three and five layers in most cases). One extruder was flood fed with pellets from either process 3 or process step 1, 2, 4 and made into an inner core layer. The second extruder was flood fed with a thermoplastics. The third extruder was flood fed with either a nylon 6 resin, an EVOH resin, or an adhesive resin (also known as tie resins) which can effectively bind to either EVOH or nylon 6. Extruder temperatures were approximately 240–250° C. in all three extruders. Extrudates passed through the slit die onto a heated cast roll. Film thickness was adjusted via cast roll speed and/or screw RPM to prepare a film of the following thickness (unless otherwise noted): 0.001 inch (0.0254 mm) of the inner layer of active barrier nylon 6 or EVOH which was modified with Poly BD and cobalt, 0.001 inch (0.0254 mm) each of two outer layers, and 0.0005 inch (0.01270 mm) each of the intermediate layers.

Oxygen Transmission Measurements

Oxygen transmission measurements were conducted on film samples on a Mocon Oxtran 2/20 apparatus equipped with SL sensors. Tests were conducted at various relative humidity using 100% oxygen. Data were collected as a function of time and recorded in units of: cc/100 in$^2$/day.

DESCRIPTION OF EXAMPLES

Listed in the Table 1 and 2 are the summarized results obtained from the following examples which illustrate the effect on oxygen transmission rate of the oxygen binding system described herein.

Comparative Examples 1–6

Comparative Examples 1–6 are useful as reference points or "baselines" for the examples which will be described later. Comparative Example 1 was made into a monolayer film by process step 5. Comparative Examples 2–6 were prepared into a multilayer film by process step 6, which contains ethylene vinyl alcohol copolymers (EVOH) in one of the layers. Comparative Example 1 is a monolayer of nylon 6 (73 formic acid viscosity) which is 0.001 inch (0.0254 mm) thick. Comparative Example 2 is a three layer coextrusion consisting of an inner layer of nylon 6 (73 formic acid viscosity) and two outer layers of ethylene vinyl alcohol copolymers (EVOH, 32% ethylene content). The thickness of the inner nylon 6 layer is 0.001 inch (0.0254 mm), and EVOH layer is 0.0005 inch (0.01270 mm) each. The addition of EVOH enhances the oxygen barrier; however, the moisture sensitivity at high relative humidity is more noticeable as shown in Table 1. Comparative Example 3 is five layer coextrusion consisting of an inner layer of nylon 6 (73 formic acid viscosity), two adjacent layers of EVOH (32% ethylene content), and two outer layers of nylon 6 (73 formic acid viscosity). In comparative Example 3, the thickness of the inner nylon 6 layer is 0.001 inch (0.0254 mm), EVOH layer is 0.0005 inch (0.01270 mm) each, and two outer layer of nylon 6 is 0.001 inch (0.0254 mm) each. Comparative Example 3 illustrates that the addition of two outer layers of nylon 6 has no affect on the oxygen transmission rate as compared to Comparative Example 2. Comparative Example 4 is the same as Comparative Example 3 except modified polyethylene (5 melt index) was used as two outer layers. Although the addition of two outer polyolefin layers minimizes the time it takes for EVOH and nylon 6 to pick up the moisture, its equilibrium oxygen transmission rate as measured by MOCON in Comparative Example 4 was not affected. In Comparative example 1 containing a monolayer nylon 6 and Comparative Examples 2–4 containing EVOH, significant moisture sensitivity on oxygen barrier was observed, that is, the oxygen transmission rate worsened as the relative humidity was increased as shown in Table 1.

Comparative Example 5 is a three layer coextrusion consisting of an inner layer of EVOH (32% ethylene content, DC3203, made by Nippon Gohsei) and two outer layers of nylon 6 (73 formic acid viscosity). The thickness of the inner EVOH layer is 0.001 inch (0.0254 mm), and two outer layers of EVOH is 0.0005 inch (0.01270 mm) each. Example 6 is a five-layer coextruded film consisting of an inner layer of EVOH (32% ethylene content), two adjacent layers of adhesive layer based on maleic anhydride modified PE (5 melt index, ASTM D1238), and two outer skins of polyethylene (7 melt index). Examples 5 and 6 were prepared by process steps 6, in which the core EVOH layer is about 0.001 in (0.0254 mm), adhesive layer about 0.0003 in (0.00762 mm) each side, and outer skin about 0.0008 in (0.0203 mm) each side.

Examples 1–7

Examples 1–7 illustrate the effect on the oxygen transmission rate of an EVOH-containing structure which was coextruded with a layer of nylon and/or its blends modified with an active oxygen binding system. The examples illustrate the dramatic improvement in oxygen binding ability incorporated into nylon which was coextruded with an EVOH-containing structures of this invention. In general in all examples the oxygen binding maleic anhydride functionalized polybutadiene is nano/micro-phase separated from the nylon matrix with polybutadiene particle size on the order of 10–1000 nm. Example 1 is the same as Comparative Example 2 except the inner core layer was a nylon 6 (73 formic acid) containing 3 weight percent Poly BD 131 MA5 and 100 ppm by weight of cobalt. Process methods of 1, 2, and 4 were used to prepare the active barrier nylon 6 pellets, which were then coextruded with a standard grade of EVOH (32% ethylene content) by process method 6. Example 2 is the same as Comparative Example 2 except that the inner core layer containing 3 weight percent Poly BD 131 MA5, 2% organo-clay (made by Nanocor Nanomer I24T), and 100 ppm by weight of cobalt. Example 3 is the same as Comparative Example 3 except the inner core layer was a nylon 6 (73 formic acid) containing 3 weight percent Poly BD 131 MA5 and 100 ppm by weight of cobalt. Example 4 is the same as Comparative Example 3 except the inner core layer was a nylon 6 (73 formic acid) containing 3 weight percent Poly BD 131MA5, 2% organo-clay (made by Nanocor Nanomer I24T), and 100 ppm by weight of cobalt. Example 5 is the same as example 3 except the film was oriented three times in machine direction. Example 6 is the same as Comparative Example 4 except the inner core layer was a nylon 6 (73 formic acid) containing 3 weight percent Poly BD 131MA5 and 100 ppm by weight of cobalt. Example 7 is the same as Comparative Example 4 except the inner core layer was a nylon 6 (73 formic acid) containing 3 weight percent Poly BD 131MA5, 2% organo-clay (made by Nanocor Nanomer 124T), and 100 ppm by weight of cobalt. At low relative humidity (i.e., 0%), adjacent EVOH layers next to an inner layer of nylon provides sufficient oxygen barrier in Examples 1–7 that can be unmatched by a monolayer nylon alone (Comparative Example 1) with or without Poly BD and cobalt. With the addition of Poly BD and cobalt in the nylon layer which was then coextruded with an EVOH-containing structure in Examples 1–7 (with and without organo-clay), the whole structure scavenges oxygen at high relative humidity (i.e., 65% and 90%) as shown in Table 1 and thus becomes insensitive to moisture across all relative humidity ranges. It is also noted the near zero oxygen transmission rate was extended for a prolonged period of time as shown in Table 2. The near zero oxygen transmission rate was extended much longer at lower relative humidity region instead of 90% shown in Table 2. For example, Example 1 at 80%RH extended the near zero oxygen transmission rate for at least 40 days in 100% oxygen.

Examples 8–9

Examples 8 and 9 illustrate the effect of the oxygen binding system on EVOH which was coextruded in a multilayer structure. The examples illustrate the dramatic improvement in oxygen binding ability incorporated into EVOH which was coextruded with other thermoplastics. In general in all examples the oxygen binding maleic anhydride functionalized polybutadiene is nano/micro-phase separated from the EVOH matrix with polybutadiene particle size on the order of 10–10000 nm. In Examples 8–9 of this invention, the inner core layer is always an EVOH containing 3 weight percent Poly BD 131MA5 and 100 ppm by weight of cobalt. Example 8 is the same as Comparative Example 5 except the inner core layer was an EVOH (32% ethylene content) containing 3 weight percent Poly BD 131MA5 and 100 ppm by weight of cobalt. Example 9 is the same as Comparative Example 5 except the inner core layer was a retortable EVOH (32% ethylene content, SG372, made by Nippon Gohsei) containing 3 weight percent Poly BD 131 MA5 and 100 ppm by weight of cobalt. Example 9 was subjected to retort conditions at 121° C. for 30 min in steam. Example 8 and Example 9, both before and after retort, clearly illustrate the dramatic improvement of oxygen binding ability of the EVOH in a multilayer structure of this invention which effectively lowered the oxygen transmission rate to near zero level for a prolonged period of time. Similar to Examples 1–7, it is also noted that all samples in Example 8–9 remain at almost zero (0.006 or less) oxygen transmission rate across all relative humidity range as shown in Table 1. The near zero oxygen transmission rate was extended for a prolonged period of time in all examples as shown in Table 2. It is noted that the near zero oxygen transmission rate can be extended much longer at lower relative humidity region versus 90% relative humidity reported in Table 2.

TABLE 1

| Example No. | Process Step | Wt. % PBD* | Wt. %, Resin | PPM Co | Two Adjacent layers[††] | Two Outer layers[††] | OTR[†] @0% RH | OTR[†] @65% RH | OTR[†] @90% RH |
|---|---|---|---|---|---|---|---|---|---|
| Comparative 1 | 5 | 0 | 100, Nylon | 0 | N/A | N/A | 2.6 | 3.0 | 6.6 |
| Comparative 2 | 6 | 0 | 100, Nylon | 0 | EVOH | N/A | 0.008 | 0.02 | 0.26 |
| Comparative 3 | 6 | 0 | 100, Nylon | 0 | EVOH | Nylon | 0.005 | 0.013 | 0.20 |
| Comparative 4 | 6 | 0 | 100, Nylon | 0 | EVOH | m-PE[a] | 0.005 | 0.02 | 0.23 |
| Comparative 5[f] | 6 | 0 | 100, EVOH | 0 | Nylon | N/A | 0.005 | 0.02 | 0.15 |
| Comparative 6[f] | 6 | 0 | 100, EVOH | 0 | m-PE[a] | PE | 0.006 | 0.02 | 0.16 |
| 1 | 1, 2, 4, 6 | 3 | 97, Nylon | 100 | EVOH | N/A | 0.003 | 0.003 | 0.003 |
| 2 | 1, 2, 4, 6 | 3 | 95, 2, Nylon[b] | 100 | EVOH | N/A | 0.003 | 0.003 | 0.004 |
| 3 | 3, 6 | 3 | 97, Nylon | 100 | EVOH | Nylon | 0.003 | 0.003 | 0.003 |
| 4 | 1, 2, 4, 6 | 3 | 95, 2, Nylon[b] | 100 | EVOH | Nylon | 0.003 | 0.003 | 0.005 |
| 5 | 1, 2, 4, 6 | 3 | 97, Nylon | 100 | EVOH | Nylon | 0.003 | 0.01 | 0.01 |
| 6 | 1, 2, 4, 6 | 3 | 97, Nylon | 100 | EVOH | m-PE[a] | 0.003 | 0.003 | 0.004 |
| 7 | 1, 2, 4, 6 | 3 | 95, 2, Nylon[b] | 100 | EVOH | m-PE[a] | 0.003 | 0.003 | 0.003 |
| 8[a] | 1, 2, 4, 6 | 3 | 97, EVOH | 100 | Nylon | N/A | 0.003 | 0.003 | 0.003 |
| 9[a] (before and after retort) | 1, 2, 4, 6 | 3 | 97, EVOH[c] | 100 | Nylon | N/A | 0.003 | 0.003 | 0.003 |

*Ricon PBD 131MA5 (unless otherwise noted)
**Barrier resin can be either nylon 6 commercially available from Honeywell or EVOH commercially available from EVALCA and Nippon Gohsei. Barrier resin layer thickness (nylon 6 or EVOH) was about 0.001 in (0.0254 mm) in all examples.
[†]Units: cc mil/100 in$^2$/atm day, tested in 100% oxygen. To convert to cc mm/m$^2$/atm day, multiply by 3.94 × 10$^{-1}$.
[††]Multilayer film structure (three or five) with the following thickness (unless otherwise noted): 0.001 inch (0.0254 mm) of active barrier nylon 6 (modified with Poly BD and cobalt) inner core layer, 0.001 inch (0.0254 mm) each of two outer layers, and 0.0005 inch (0.01270 mm) each of the adjacent layers.
[a]Commercially available maleic anhydride modified polyethylene from Mitsui Chemicals.
[b]2% of organo-clay made by Nanocor Nanomer I24T was added into active barrier layer.
[c]Commercially available retortable grade EVOH from Nippon Gohsei
[d]Multilayer film structure (three or five) with an EVOH core has the following thickness: 0.001 inch (0.0254 mm) of active barrier EVOH (modified with Poly BD and cobalt) inner core layer, 0.0003 inch (0.00762 mm) each of the adjacent layers, and 0.0008 inch (0.0203 mm) each of two outer layers.

TABLE 2

| Example No. | Process Steps | Inner core layer Wt. % PBD | Wt. % Resin** | PPM Co | Two Adjacent layers†† | Two Outer layers†† | OTR† Day 1 | OTR Day 2 | OTR Day 3 | OTR Day 4 | OTR Day 5 | OTR Day 7 | OTR Day 10 | OTR Day 15 | OTR Day 20 |
|---|---|---|---|---|---|---|---|---|---|---|---|---|---|---|---|
| Comparative 1 | 5 | 0 | 100, Nylon | 0 | N/A | N/A | 6.7 | 6.6 | 6.6 | 6.6 | 6.6 | N/A | N/A | N/A | N/A |
| Comparative 2 | 6 | 0 | 100, Nylon | 0 | EVOH | N/A | 0.27 | 0.26 | 0.26 | 0.26 | 0.26 | N/A | N/A | N/A | N/A |
| Comparative 3 | 6 | 0 | 100, Nylon | 0 | EVOH | Nylon | 0.21 | 0.20 | 0.20 | 0.20 | 0.20 | N/A | N/A | N/A | N/A |
| Comparative 4 | 6 | 0 | 100, Nylon | 0 | EVOH | m-PE[a] | 0.25 | 0.23 | 0.23 | 0.23 | 0.23 | N/A | N/A | N/A | N/A |
| Comparative 5[e] | 6 | 0 | 100, EVOH | 0 | Nylon | N/A | 0.16 | 0.15 | 0.15 | 0.15 | 0.15 | N/A | N/A | N/A | N/A |
| Comparative 6[e] | 6 | 0 | 100, EVOH | 0 | m-PE[a] | PE | 0.14 | 0.16 | 0.16 | 0.16 | 0.16 | N/A | N/A | N/A | N/A |
| 1 | 1, 2, 4, 6 | 3 | 97, Nylon | 100 | EVOH | N/A | 0.003 | 0.003 | 0.003 | 0.003 | 0.003 | 0.003 | 0.04 | 0.2 | N/A |
| 3 | 3, 6 | 3 | 97, Nylon | 100 | EVOH | Nylon | 0.003 | 0.003 | 0.003 | 0.003 | 0.003 | 0.003 | 0.008 | 0.09 | N/A |
| 6 | 1, 2, 4, 6 | 3 | 97, Nylon | 100 | EVOH | m-PE[a] | 0.011 | 0.003 | 0.003 | 0.006 | 0.007 | 0.01 | 0.05 | 0.21 | N/A |
| 8[c] | 1, 2, 4, 6 | 3 | 97, EVOH | 100 | Nylon | N/A | 0.003 | 0.003 | 0.003 | 0.003 | 0.003 | 0.003 | 0.003 | 0.003 | 0.05 |
| 9[c] (before retort) | 1, 2, 4, 6 | 3 | 97, EVOH[b] | 100 | Nylon | N/A | 0.003 | 0.003 | 0.003 | 0.003 | 0.003 | 0.003 | 0.05 | N/A | N/A |
| 9[c] (after retort) | 1, 2, 4, 6 | 3 | 97, EVOH[b] | 100 | Nylon | N/A | 0.003 | 0.003 | 0.003 | 0.003 | 0.008 | 0.06 | 0.50 | N/A | N/A |

*Ricon PBD 131MA5 (unless otherwise noted)
**Active barrier can be either nylon 6 commercially available from Honeywell or EVOH commercially available from EVALCA and Nippon Gohsei. Active barrier thickness (nylon 6 or EVOH) was about 0.001 in (0.0254 mm) in all examples.
†Units: cc mil/100 in²/atm day, tested at 90% relative humidity with 100% oxygen. To convert to cc mm/m²/atm day, multiply by $3.94 \times 10^{-1}$.
††Multilayer film structure (three or five) with the following thickness (unless otherwise noted): 0.001 inch (0.0254 mm) of active barrier nylon 6 (modified with Poly BD and cobalt) inner core layer, 0.001 inch (0.0254 mm) each of two outer layers, and 0.0005 inch (0.01270 mm) each of the adjacent layers.
[a]Commercially available maleic anhydride modified polyethylene from Mitsui Chemicals.
[b]Commercially available retortable grade EVOH from Nippon Gohsei.
[c]Multilayer film structure (three or five) with an EVOH core has the following thickness: 0.001 inch (0.0254 mm) of active barrier EVOH (modified with Poly BD and cobalt) inner core layer, 0.0003 inch (0.00762 mm) each of the adjacent layers, and 0.0008 inch (0.0203 mm) each of two outer layers.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. An oxygen barrier film which comprises:
   a) a polyamide layer comprising a polyamide homopolymer, copolymer, or blends thereof;
   b) an ethylene vinyl alcohol copolymer layer attached to the polyamide layer; and
   c) an oxidizable polydiene and a metal salt catalyst present together in at least one of the polyamide layer and the ethylene vinyl alcohol copolymer layer.

2. The film of claim 1 wherein the oxidizable polydiene comprises a polybutadiene.

3. The film of claim 1 wherein the oxidizable polydiene comprises an epoxy or anhydride functional polybutadiene.

4. The film of claim 1 wherein the oxidizable polydiene comprises particles which are substantially uniformly distributed in at least one of the polyamide layer and the ethylene vinyl alcohol copolymer layer.

5. The film of claim 1 wherein the oxidizable polydiene comprises particles whose average particle size is in the range of from about 10 nm to about 1000 nm, and which particles are substantially uniformly distributed in at least one of the polyamide layer and the ethylene vinyl alcohol copolymer layer.

6. The film of claim 1 wherein the metal salt catalyst is a metal carboxylate salt.

7. The film of claim 1 wherein the metal salt catalyst is selected from the group consisting of metal acetates, stearates, propionates, hexanoates, octanoates, benzoates, salicylates, cinnamates and combinations thereof.

8. The film of claim 1 wherein the metal salt catalyst is selected from the group consisting of a cobalt, copper or ruthenium, acetate, stearate, propionate, hexanoate, octanoate, benzoate, salicylate or cinnamate, and combinations thereof.

9. The film of claim 1 further comprising a clay in at least one of the polyamide layer and the ethylene vinyl alcohol copolymer layer.

10. The film of claim 1 further comprising a clay in at least one of the polyamide layer and the ethylene vinyl alcohol copolymer layer, whose average platelet thickness is in the range of from about 1 nm to about 100 nm and whose average length and average width are each in the range of from about 50 nm to about 500 nm.

11. The film of claim 1 wherein the polyamide homopolymer or copolymer or blends thereof comprise aliphatic or aliphatic/aromatic polyamides.

12. The film of claim 1 wherein said polyamide comprises nylon 6.

13. The film of claim 1 wherein said ethylene vinyl alcohol copolymer is retortable.

14. The film of claim 1 wherein the polyamide layer comprises a blend of said polyamide homopolymer, copolymer, or blends thereof, said oxidizable polydiene, and said metal salt catalyst.

15. The film of claim 1 wherein the polyamide layer comprises a reaction product of said polyamide homopolymer, copolymer, or blends thereof, said an oxidizable polydiene, and said metal salt catalyst.

16. The film of claim -wherein the ethylene vinyl alcohol copolymer layer comprises a blend of said ethylene vinyl alcohol copolymer, said oxidizable polydiene and said metal salt catalyst.

17. The film of claim 1 wherein the ethylene vinyl alcohol copolymer layer comprises a reaction product of said ethylene vinyl alcohol copolymer, said oxidizable polydiene and said metal salt catalyst.

18. The film of claim 1 which is oriented in at least one direction.

19. The film of claim 1 further comprising a thermoplastic polymer layer on one or both sides of the film.

20. A multilayer article which comprises an oxygen barrier film comprising:
   A) a multilayer film comprising:
      a) a polyamide layer comprising a polyamide homopolymer, copolymer, or blends thereof;
      b) an ethylene vinyl alcohol copolymer layer attached to the polyamide layer;
      c) an oxidizable polydiene and a metal salt catalyst present together in at least one of the polyamide layer and the ethylene vinyl alcohol copolymer layer; and
   B) a thermoplastic polymer layer on one or both sides of the film.

21. The multilayer article of claim 20 wherein the polyamide layer further comprises a clay.

22. The multilayer article of claim 20 wherein the thermoplastic polymer layer comprises a polyolefin or polyester.

23. The multilayer article of claim 20 wherein the thermoplastic polymer layer comprises a polyethylene terephthalate.

24. The multilayer article of claim 20 wherein the thermoplastic polymer layer and the film are attached to one another by coextrusion, lamination or coinjection.

25. A shaped article which comprises an oxygen barrier film comprising:
   a) a polyamide layer comprising a polyamide homopolymer, copolymer, or blends thereof;
   b) an ethylene vinyl alcohol copolymer layer attached to the polyamide layer;
   c) an oxidizable polydiene and a metal salt catalyst present together in at least one of the in at least one of the polyamide layer and the ethylene vinyl alcohol copolymer layer.

26. The shaped article of claim 25 wherein the polyamide layer further comprises a clay.

27. The shaped article of claim 25 which is in the form of a bottle or container.

28. A process for producing an oxygen barrier film which comprises:
   a) separately melting a polyamide homopolymer, copolymer, or blends thereof; and an ethylene vinyl alcohol copolymer;
   b) blending an oxidizable polydiene, and a metal salt catalyst with either or both of the molten polyamide homopolymer, copolymer, or blend thereof, and the molten ethylene vinyl alcohol copolymer to thereby form an individual polyamide composition and an individual ethylene vinyl alcohol composition;
   c) extruding, casting or blowing the individual compositions into an individual polyamide film layer and an individual ethylene vinyl alcohol copolymer layer;
   d) cooling the polyamide layer and the ethylene vinyl alcohol copolymer layer; and
   e) attaching the polyamide layer and ethylene vinyl alcohol copolymer layer to each other.

29. The process of claim 28 which comprises blending a clay with the polyamide composition.

30. The process of claim 28 which comprises blending a clay with the ethylene vinyl alcohol composition.

31. The process of claim 28 wherein the film is subsequently oriented.

32. A process for producing an oxygen barrier film which comprises:
   a) melting a polyamide homopolymer, copolymer, or blends thereof; and blending with an oxidizable polydiene and a metal salt catalyst therewith to form a polyamide composition and forming a polyamide film layer from the polyamide composition;
   b) melting an ethylene vinyl alcohol copolymer; and blending the copolymer with an oxidizable polydiene and a metal salt catalyst to form an ethylene vinyl alcohol composition, and forming an ethylene vinyl alcohol film layer from the an ethylene vinyl alcohol composition; and
   c) conducting step (i) or (ii) or (iii):
      (i) attaching the polyamide film layer to a neat ethylene vinyl alcohol copolymer film layer which is substantially free of oxidizable polydiene and metal salt catalyst;
      (ii) attaching the ethylene vinyl alcohol copolymer film layer to a neat polyamide film layer which is substantially free of oxidizable polydiene and metal salt catalyst; or
      (iii) attaching the polyamide film layer to the ethylene vinyl alcohol copolymer film layer.

33. The process of claim 32 which comprises blending a clay with the polyamide homopolymer, copolymer or blend thereof.

34. The process of claim 32 which comprises a blending a clay with the ethylene vinyl alcohol copolymer composition.

35. The process of claim 32 wherein the film which is subsequently oriented in at least one direction.

36. A process for producing an oxygen barrier article which comprises:
   a) separately melting a polyamide homopolymer, copolymer, or blends thereof; and an ethylene vinyl alcohol copolymer;
   b) blending an oxidizable polydiene, and a metal salt catalyst with either or both of the molten polyamide homopolymer, copolymer, or blend thereof and the molten ethylene vinyl alcohol copolymer to thereby form an individual polyamide composition and an individual ethylene vinyl alcohol composition;
   c) conducting either step (i) or (ii) or (iii):
      (i) coextruding, casting, blowing, thermoforming, blow molding or coinjecting the polyamide composition with the ethylene vinyl alcohol copolymer composition to thereby form an oxygen barrier article;
      (ii) melting a neat polyamide homopolymer, copolymer, or blend thereof which is substantially free of oxidizable polydiene and metal salt catalyst to forma neat polyamide composition; and then coextruding, casting, blowing, thermoforming, blow molding or coinjecting the neat polyamide composition with the ethylene vinyl alcohol copolymer composition to thereby form an oxygen barrier article;

(iii) melting a neat ethylene vinyl alcohol copolymer which is substantially free of oxidizable polydiene and metal salt catalyst to form a neat ethylene vinyl alcohol composition; and then coextruding, casting, blowing, thermoforming, blow molding or coinjecting the neat ethylene vinyl alcohol composition with the polyamide composition to thereby form an oxygen barrier article.

37. The process of claim 36 wherein the article is in the form of a film or a thermoformed container.

\* \* \* \* \*